(12) United States Patent
Sauthoff et al.

(10) Patent No.: US 11,220,901 B2
(45) Date of Patent: Jan. 11, 2022

(54) ELECTRICAL DOWNHOLE COMMUNICATION CONNECTION FOR DOWNHOLE DRILLING

(71) Applicants: Bastian Sauthoff, Burgdorf (DE); Cord Simon Huber, Gehrden (DE)

(72) Inventors: Bastian Sauthoff, Burgdorf (DE); Cord Simon Huber, Gehrden (DE)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 93 days.

(21) Appl. No.: 16/713,186

(22) Filed: Dec. 13, 2019

(65) Prior Publication Data
US 2020/0190972 A1 Jun. 18, 2020

Related U.S. Application Data

(60) Provisional application No. 62/779,783, filed on Dec. 14, 2018.

(51) Int. Cl.
*E21B 17/02* (2006.01)
*E21B 47/12* (2012.01)
(Continued)

(52) U.S. Cl.
CPC ............ *E21B 47/12* (2013.01); *E21B 17/003* (2013.01); *E21B 17/028* (2013.01); *E21B 49/08* (2013.01); *F16L 15/001* (2013.01); *F16L 25/01* (2013.01)

(58) Field of Classification Search
CPC .............................. E21B 17/028; E21B 17/003
See application file for complete search history.

(56) References Cited

U.S. PATENT DOCUMENTS 2,531,120 A * 11/1950 Feaster ................. E21B 17/003
175/104
3,518,609 A * 6/1970 Fontenot, Jr. ........... E21B 47/12
439/191
(Continued)

OTHER PUBLICATIONS

Notification of Transmittal of the International Preliminary Report on Patentability of the International Searching Authority, PCT/US2019/066215; dated Jun. 24, 2021, 9 pages.
(Continued)

*Primary Examiner* — Giovanna Wright
(74) *Attorney, Agent, or Firm* — Cantor Colburn LLP

(57) ABSTRACT

A downhole assembly includes a first tubular including a first shoulder and a second tubular including a second shoulder. The assembly further includes a transmission element having a first portion disposed in the first shoulder, the first portion includes an electrically conductive member having a first arc length and a second portion disposed in the second shoulder. The second portion includes a contacting element having a second arc length that is substantially less than the first arc length and further includes an outer insulating carrier that defines a groove. The contacting element is disposed in the groove. When the first tubular is joined to the second tubular, the contacting element contacts the electrically conductive member and the second portion defines at least one region between the electrically conductive member and the second portion in areas of the groove where the contacting element does not contact the electrically conductive member.

21 Claims, 14 Drawing Sheets

(51) Int. Cl.
*E21B 49/08* (2006.01)
*F16L 15/00* (2006.01)
*E21B 17/00* (2006.01)
*F16L 25/01* (2006.01)

(56) References Cited

U.S. PATENT DOCUMENTS

| | | | |
|---|---|---|---|
| 3,879,097 | A | 4/1975 | Oertle |
| 4,445,734 | A * | 5/1984 | Cunningham ....... H01R 13/523 439/194 |
| 6,688,396 | B2 | 2/2004 | Floerke et al. |
| 6,844,498 | B2 | 1/2005 | Hall et al. |
| 7,114,970 | B2 | 10/2006 | Head |
| 7,150,479 | B2 | 12/2006 | Benedict et al. |
| 7,458,617 | B2 | 12/2008 | Leslie et al. |
| 8,033,329 | B2 | 10/2011 | Montgomery et al. |
| 8,287,005 | B2 | 10/2012 | Leslie et al. |
| 2009/0101328 | A1 * | 4/2009 | Leslie .................. E21B 17/003 166/65.1 |
| 2009/0166087 | A1 | 7/2009 | Braden et al. |
| 2009/0322553 | A1 | 12/2009 | Clark et al. |

OTHER PUBLICATIONS

Notification of Transmittal of the International Search Report of the International Searching Authority, or the Declaration; PCT/US2019/066215; dated Apr. 10, 2020, 3 pages.
Notification of Transmittal of the Written Opinion of the International Searching Authority, or the Declaration; PCT/US2019/066215; dated Apr. 10, 2020, 7 pages.

* cited by examiner

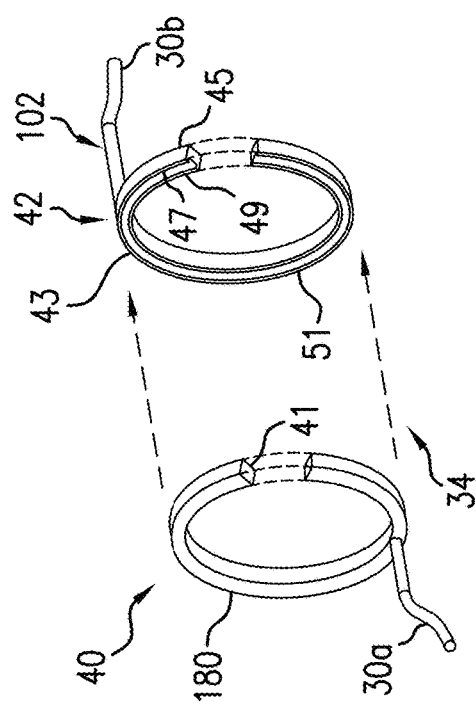
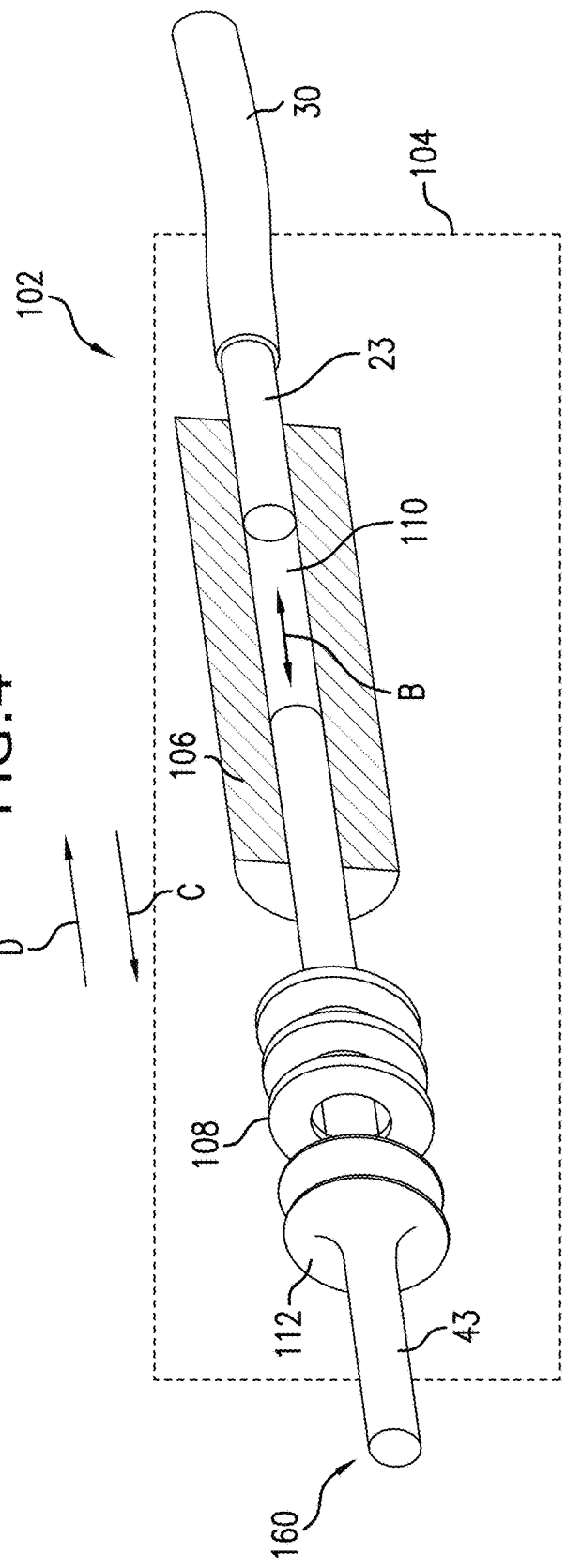
FIG.4
FIG.5

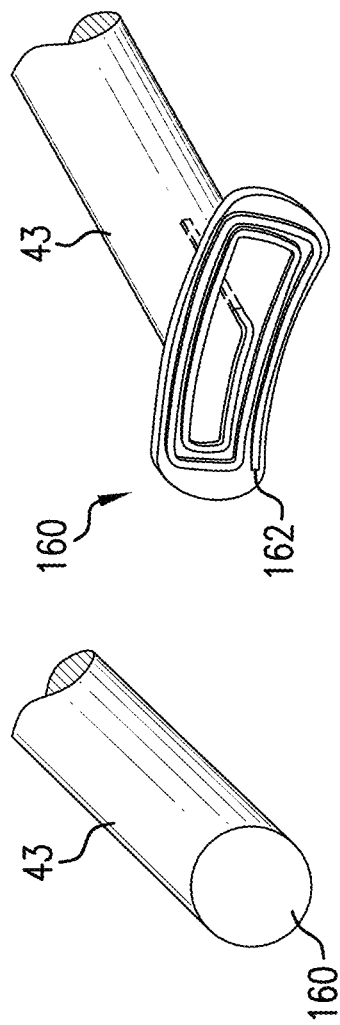
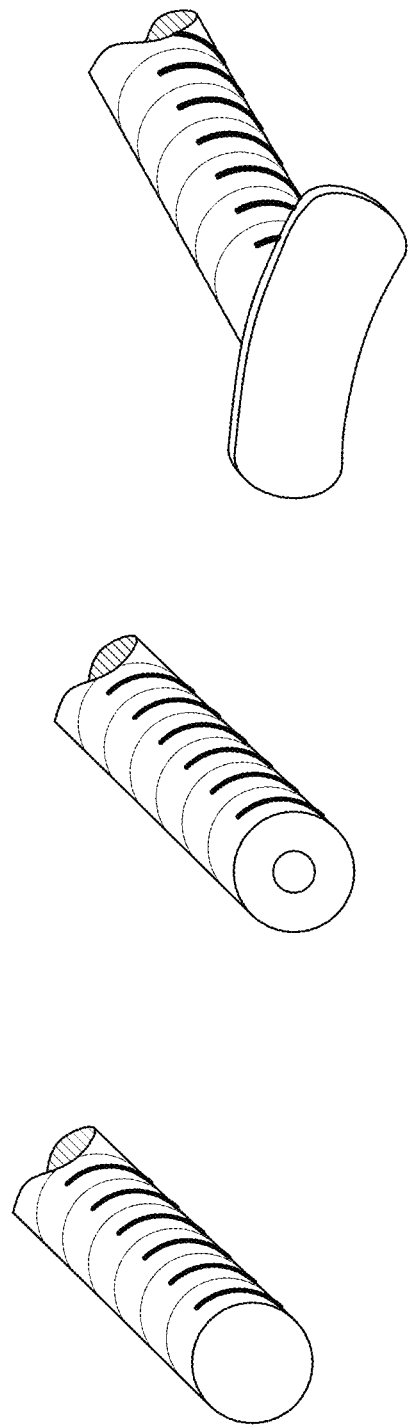

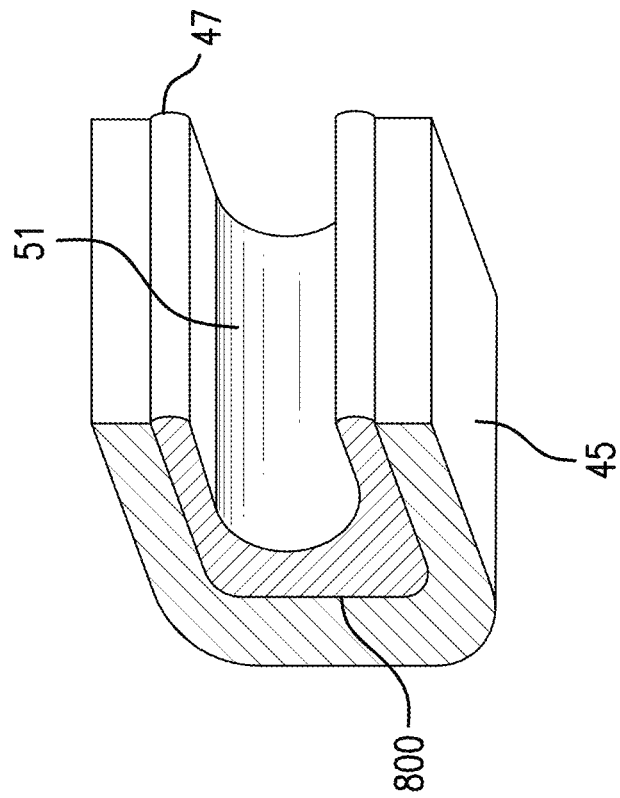
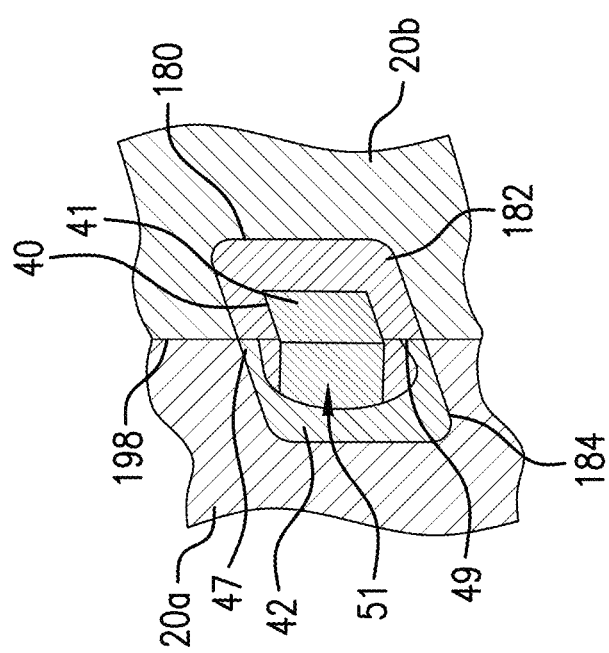
FIG. 7
FIG. 8

ELECTRICAL DOWNHOLE COMMUNICATION CONNECTION FOR DOWNHOLE DRILLING

CROSS REFERENCE TO RELATED APPLICATIONS

This application claims the benefit of an earlier filing date from U.S. Provisional Application Ser. No. 62/779,783 filed Dec. 14, 2018, the entire disclosure of which is incorporated herein by reference.

BACKGROUND

During subterranean drilling and completion operations, a pipe or other conduit is lowered into a borehole in an earth formation during or after drilling operations. Such pipes are generally configured as multiple pipe segments to form a "string", such as a drill string or production string.

There are many types of tools for drilling a borehole into an earth formation or for characterizing the formation by performing measurements from the borehole. These tools are typically disposed at the distal end of the drill string used to drill the borehole with a rotating drill bit. The arrangement of the downhole tools is generally referred to as a bottom-hole assembly (BHA).

Various power and/or communication signals may be transmitted between portions of the BHA and through the pipe segments via electrical lines. Such lines include electrical, optical or other conductors extending along the BHA or pipe segments. The conductors are operably connected between tools of the BHA or pipes of the electrical line system by a variety of coupling configurations.

One such coupling configuration includes a threaded male-female configuration often referred to as a pin-box connection. The pin box connection includes a male member, i.e., a "pin" that includes an exterior threaded portion, and a female member, i.e., a "box", that includes an interior threaded portion and is configured to receive the pin in a threaded connection.

Some BHA and wired pipe configurations include a transmission device mounted on the shoulders of the pin/box ends. The transmission device can transmit power, data or both to an adjacent coupler.

For use in a harsh downhole environment, pipes, tubulars, BHA frames or housings, or other conduits that are lowered into a borehole in an earth formation during or after drilling operations are made of metal for mechanical strength. Such pipes or other conduits are general conductors, and cause damping issues for data signals being transmitted therethrough.

The simultaneous transmission of both, data with a high frequency signal and power, leads to the challenge to preserve the data signal from damping loss in every transmission device. Furthermore the cross section of the transmission line cannot be reduced because of the power transmission capability. The damping loss of a high frequency data signal in a transmission device is mainly specified by difference of the characteristic impedance Z of the transmission device and the transmission line. Based on the physics of electromagnetic waves, an optimal high frequency data transmission system in a drill string consist of elements, which have all the same characteristic impedance Z as the transmission line.

BRIEF DESCRIPTION

Disclosed herein is a downhole assembly that includes an electrical power and high frequency communication data downhole transmission connection, which has a characteristic impedance which is equal or near the characteristic impedance of the transmission line and which has a maximized (or increased compared to prior "two ring systems") Q-factor to reduce signal damping for high frequencies. Therefore, the capacitance of the connection is minimized by reduction of the relative permittivity at special locations of the connection.

Also disclosed is a bottom hole assembly that includes an electrical power and high frequency communication data transmission downhole connection.

Embodiments of the downhole assembly of the present invention provide their functionality when the electrical transmission line (of which the contacts are a part) transmits alternating currents with a frequency high enough that their wave nature must be taken into account. In a non-limiting embodiment, a high frequency signal could be one operating in the range 3 kHz-30 MHz. In other embodiments, a high frequency signal could be operating at less than 30 MHz, less than 25 MHz, less than 20 MHz, less than 15 MHz, less than 10 MHz, less than 5 MHz, less than 1 MHz, less than 500 kHz, less than 100 kHz, or less than 10 KHz.

To that end, disclosed herein is a downhole assembly comprising: a first tubular including a first shoulder; a second tubular including a second shoulder; and a transmission element that includes: a first portion disposed in the first shoulder, the first portion includes an electrically conductive member having a first arc length; and a second portion disposed in the second shoulder. The second portion includes a contacting element having a second arc length that is substantially less than the first arc length. The second portion further includes an outer insulating carrier that defines a groove and the contacting element is disposed in the insulating carrier. When the first tubular is joined to the second tubular, the contacting element contacts the electrically conductive member and the second portion defines at least one region between the electrically conductive member and the second portion in areas of the groove where the contacting element does not contact the electrically conductive member. The electrically conductive member can be a ring in one embodiment.

The tubular may be part of a downhole tool, such as a tool used in a Bottom Hole Assembly (BHA) in a drill string. The BHA may comprise logging while drilling tools (such as formation evaluation tools) or measurement while drilling tools. A downhole tool in a drill string may comprise a central bore for flowing drilling fluid through the downhole tool and the BHA respectively, to leave the drill string through nozzles in the drill bit. A downhole tool may be a collar based tool comprising electronics in the collar of the downhole tool, sealed by a hatch cover or a sleeve. Alternatively, a downhole tool may be a probe base tool comprising an electronics housing in the central bore of the downhole tool surrounded by drilling fluid.

The contacting element can also be a flexible contacting element.

Herein the term flexible as used in relation to a contacting element refers to a contacting element that can be axially moved and to which an axial force is applied. In one or more embodiments, the flexible contacting member is such that when the first rigid element is joined to the second rigid element, the flexible contacting element is axially moved due to application of force and thereby contact with the electrically conductive ring is established.

In one embodiment, the second portion includes sealing edges, also referred to as sealing shoulders. When the first tubular is joined to the second tubular, the contacting element contacts the electrically conductive member (or ring) and the sealing edges form a seal with the first portion that seals moisture in the gap such that the moisture does not create a short circuit between the electrically conductive member and the first and second tubulars.

Also disclosed is a method of simultaneously transmitting power and data with a high frequency signal using a downhole assembly. The method includes: providing a first tubular including a first shoulder; providing a second tubular including a second shoulder; disposing a first portion of a transmission element in the first shoulder, the first portion including an electrically conductive member having a first arc length; disposing a second portion of the transmission element in the second shoulder, the second portion including a contacting element having a second arc length, wherein the second arc length is substantially less than the first arc length, and wherein the second portion further includes an outer insulating carrier that defines a groove and the contacting element may be disposed in the groove; joining the first tubular to the second tubular such that the contacting element contacts the electrically conductive member and the second portion defines at least one region between the electrically conductive member and the second portion in areas of the groove where the contacting element does not contact the electrically conductive member; providing a signal that includes one or both of data and power to the first portion and transferring the signal to the second portion.

BRIEF DESCRIPTION OF THE DRAWINGS

The following descriptions should not be considered limiting in any way. With reference to the accompanying drawings, like elements are numbered alike:

FIG. 4 shows an example embodiment of a transmission device;

FIG. 5 shows an example of an assembly of one embodiment;

FIGS. 6A-6E show different examples of tips of the flexible contacting element;

FIG. 7 shows a local cross section taken where two rigid members meet and illustrate a gap between an electrically conductive ring of one portion of the transmission device and the other portion of the transmission device that can reduce damping as compared to having two electrically conductive rings;

FIG. 8 shows an example second portion segment that includes an insert disposed therein that defines the gap and which can serve to seal any liquid in the gap such that it cannot create a short circuit;

DETAILED DESCRIPTION

A detailed description of one or more embodiments of the disclosed system, apparatus and method are presented herein by way of exemplification and not limitation with reference to the Figures.

Figure 1:
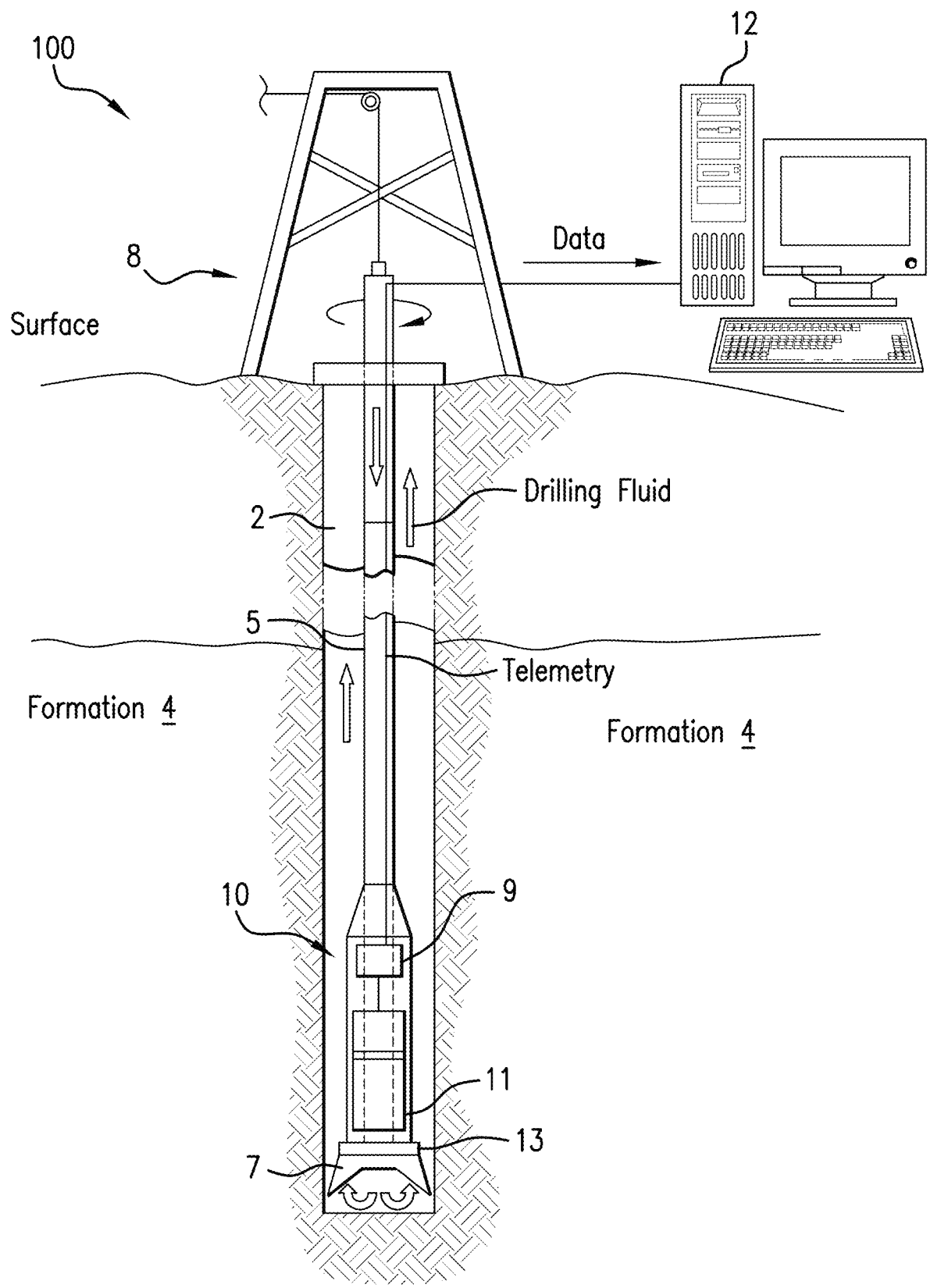
FIG. 1 depicts a cross-sectional view of a downhole system according to aspects of the present disclosure.

FIG. 1 depicts a cross-sectional view of a wellbore operation according to an embodiment of the present disclosure. The drilling, logging or production system 100 and arrangement shown in FIG. 1 is one example to illustrate the downhole environment. While the system can operate in any subsurface environment, FIG. 1 shows downhole tools 10 disposed in a borehole 2 penetrating the formation 4. The downhole tools 10 are disposed in the borehole 2 at a distal end of a carrier 5. The downhole tools 10 can include measurement tools 11 and downhole electronics 9 configured to perform one or more types of measurements in an embodiment known as Logging-While-Drilling (LWD) or Measurement-While-Drilling (MWD), or in an embodiment employing formation evaluation tools to generate formation evaluation data.

According to the LWD/MWD embodiment, the carrier 5 is a drill string that includes a bottomhole assembly (BHA) 13. The BHA 13 is a part of the drilling system 100 that includes drill collars, stabilizers, reamers, and the like, and the drill bit 7. The measurements can include measurements related to drill string operation, for example. A drilling rig 8 is configured to conduct drilling operations such as rotating the drill string and, thus, the drill bit 7. The drilling rig 8 also pumps drilling fluid through the drill string in order to lubricate the drill bit 7 and flush cuttings from the borehole 2.

The BHA 13 includes hardware and software to provide downhole "intelligence" that processes measured and preprogrammed data and writes the results to an on-board memory and/or transmits the results to the surface. For transmission to the surface in mud pulse telemetry, data is typically encoded pursuant to a selected communication protocol. Any of a wide variety of communication protocols for communicating data through a pulse series in a downhole fluid (mud) can be implemented, including frequency-shift keying (FSK), phase-shift keying (PSK), amplitude-shift keying (ASK), and combinations of the above, as well as other communication protocols.

The system also includes a surface computer 12 that can receive and process data transmitted from the BHA. The surface computer can include a memory to store data and a monitor to display data or alarms.

As shown further below, each portion of the BHA can be arranged in a housing that includes a pin end and a box end. The pin end of one portion can be inserted into the box end of another portion of a BHA to form a completed BHA as is known in the art.

Figure 2A:
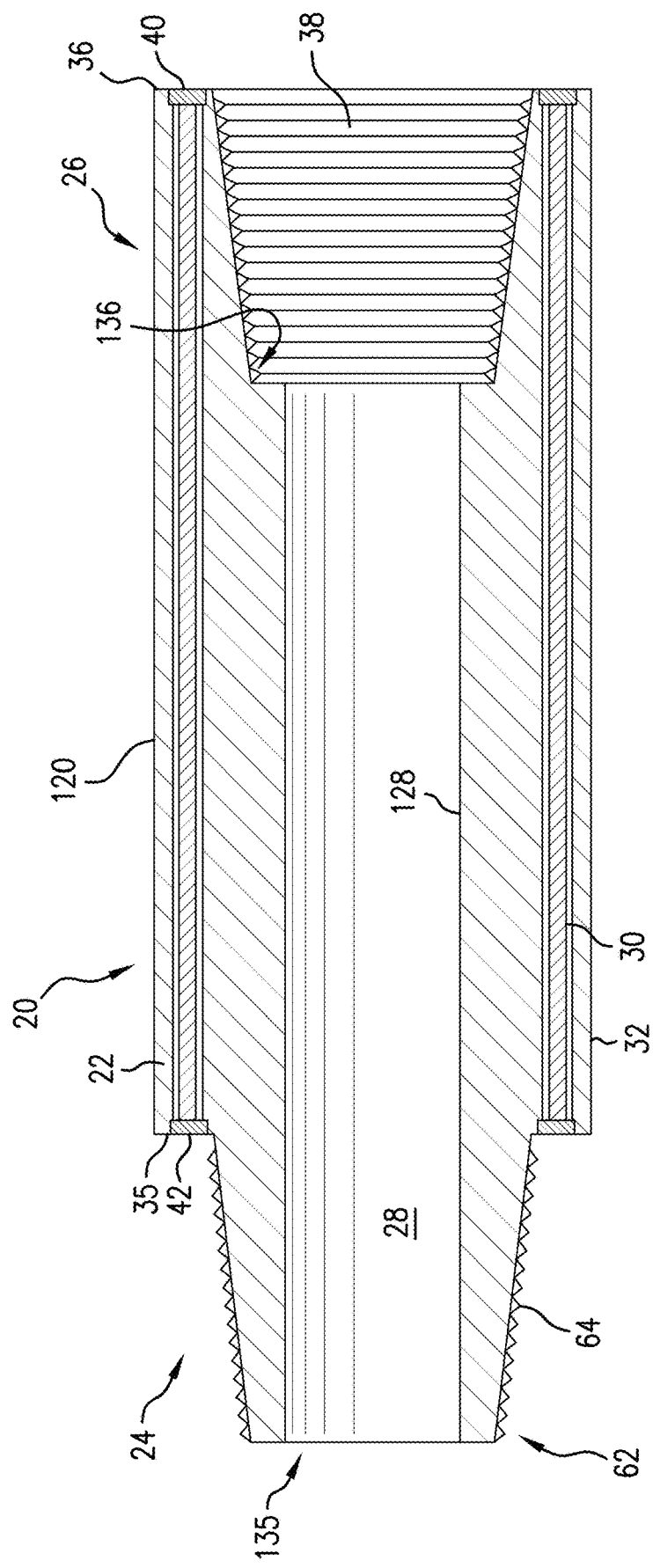
FIGS. 2A-2C depict portions of a bottom hole assembly or drill pipe of a well drilling and/or logging system.

FIG. 2A shows in cross section an example of a housing 20 for a portion of a BHA. The example housing 20 could be a drill collar in one embodiment. In another, the housing 20 could include a downhole tool (such as a formation evaluation tool, measurement while drilling tool or a steering unit) contained therein. As discussed above, the BHA includes hardware and software to provide downhole "intelligence" that in part transmits measured data to the surface. For transmission of data to the surface, a number of communication means are available, including telemetry, mud pulse telemetry, wired pipe, acoustic means and electromagnetic means.

The housing 20 includes a body 22 having a pin end 24 and a box end 26. Body 20 includes an outer surface 120. At least an inner bore or other conduit 28 extends along the length of the housing 20 to allow drilling mud or other fluids to flow therethrough. The inner bore includes an inner surface 128 of body 20. A transmission line 30 is located within a gun-drilled passageway 32 that extends between the pin end 24 and the box end 26 to provide protection for electrical conductors to be disposed along the housing 20.

In one embodiment, the transmission line 30 is a coaxial cable. In another embodiment, the transmission line 30 is formed of any manner of carrying power or data, including, for example, a twisted pair. In the case where the transmission line 30 is a coaxial cable it may include an inner conductor surrounded by a dielectric material. The coaxial cable may also include a shield layer that surrounds the dielectric material. In one embodiment, the shield layer is electrically coupled to an outer conductor that may be formed, for example, by a rigid or semi-rigid tube of a conductive material. In another embodiment, the transmission line 30 is one cable in the gun-drilled passageway 32, and is connected to an axial contact on one side and electronics or other connectors on the other side. The single cable is used as the supply conductor (positive pole). The housing (BHA/sub) is used as the return conductor (negative pole or ground).

As shown, the pin end 24 includes a pin end shoulder 35 and the box end 26 includes a box end shoulder 36. The box end shoulder 36 surrounds box end threads 38. The pin end 24 also includes pin end threads 62. These threads surround the body at the pin end 24. As will be understood, a pin end 24 of one housing 20 can be threaded into a box end 26 of an adjacent housing.

As will be further understood from the following disclosure, the shoulders 35, 36 can include first and second portions 40, 42 of a transmission device that are brought together to allow for signal connection between the transmission lines 30 of adjacent housings. The first and second portions 40, 42 of the transmission device may be located in a groove in the pin end shoulder 35 and box end shoulder 36, respectively. The groove in the pin end shoulder 35 (pin end groove) and or the box end shoulder 36 (box end groove) may be at least partially circumferential.

With reference to FIG. 2A, the first and second portions 40, 42 of the transmission device are indicated as disposed respectively within the box end shoulder 36 and the pin end shoulder 35. Box end shoulder 36 is an outer box end shoulder. Pin end shoulder 35 is an outer pin end shoulder. It will be appreciated by the skilled person that the first and second portions 40, 42 of the transmission device could also be disposed respectively within the inner box end shoulder 136 and the inner pin end shoulder 135. In this context inner refers to a location closer to the inner bore 28 of body 20 than to the outer surface 120 of body 20.

Figure 2B:
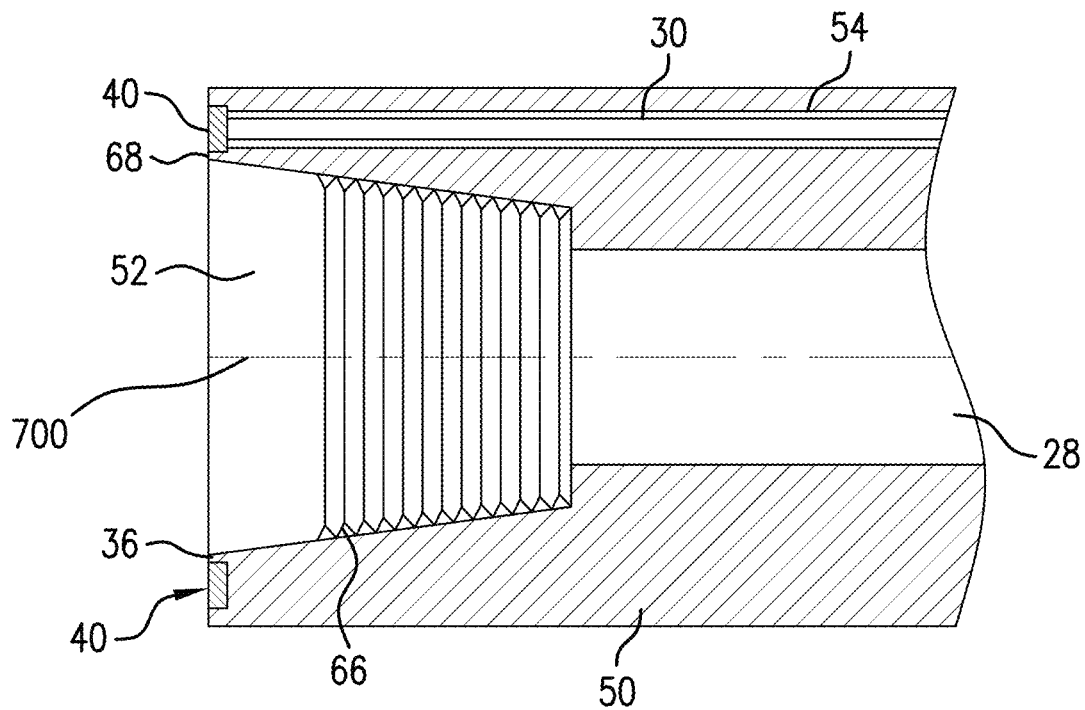
Figure 2C:
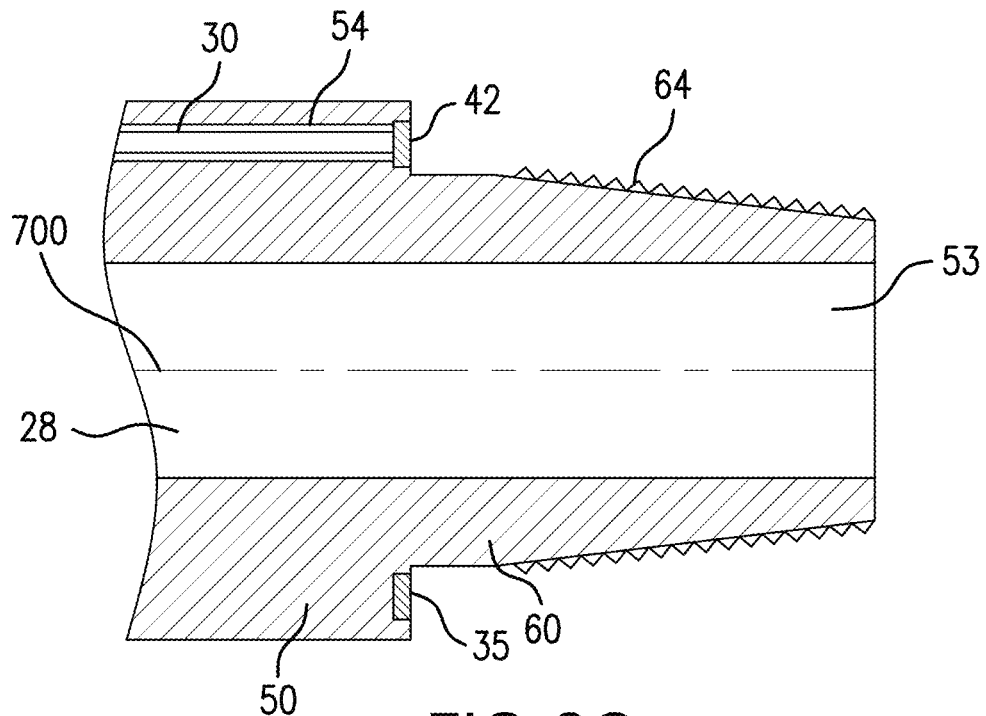

The teachings herein can be applied to a portion of a BHA such as housing 20. The teachings can also be applied to a portion of a drill string such as a pipe segment. As such, an example of such a pipe segment is shown in FIG. 2B and FIG. 2C. Herein, when generally referring to either a pipe segment, a tubular, or a housing, the term "rigid element" may be used.

Referring to FIG. 2B and FIG. 2C, an exemplary embodiment of a portion of a well drilling, logging and/or production system 100 includes a conduit or string 5 (FIG. 1), such as a drillstring, completions or production string, which may include at least one BHA or wired pipe segment 50 having an uphole end 52 and a downhole end 53.

As described herein, "uphole" refers to a location near the point where the drilling started relative to a reference location when the segment 50 is disposed in a borehole, and "downhole" refers to a location away from the point where the drilling started along the borehole relative to the reference location. It shall be understood that the uphole end 52 could be below the downhole end 53 without departing from the scope of the disclosure herein.

At least an inner bore or other conduit 28 extends along the length of each segment 50 to allow drilling mud or other fluids to flow therethrough. Similar to the above, a transmission line 30 is located within the BHA or wired segment 50 to provide protection for electrical conductors to be disposed along the wired segment 50.

With reference to FIG. 2B and FIG. 2C, the longitudinal axis 700 of the inner bore 28 and segment 50 is indicated. In the present invention, the inner bore 28 remains clear, regardless of where the first and second portions 40, 42 of the transmission device are located. In FIG. 2B and FIG. 2C, the first and second portions 40, 42 of the transmission device are located within the corresponding pin- and box-outer shoulders. However, it will be understood that by locating the first and second portions 40, 42 of the transmission device within the corresponding pin- and box-inner shoulders, the inner bore 28 also remains clear. Prior art systems for electrical downhole communication, that comprise at least one pin contact, typically have both portions of the transmission device located within the inner bore 28. Keeping the inner bore 28 clear is advantageous, as the bore area is increased leading to improved flow and reduced wash out suffered by the transmission device.

With reference to FIG. 2B and FIG. 2C, the surfaces of both the box end shoulder 36 and the pin end shoulder 35 are shown as being perpendicular to the longitudinal axis 700. It will be appreciated by the skilled person that the surfaces of these outer shoulders do not have to be perpendicular to the longitudinal axis 700. In some embodiments, the surfaces of these outer shoulders may be at an angle that is not ninety degrees to the longitudinal axis 700, in either an uphole or downhole direction, for example, forty-five degrees. As discussed above, in another embodiment, the first and second portions of the transmission device could also be disposed within the inner box- and inner pin-end shoulders. In this embodiment, the surfaces of these inner shoulders also do not have to be perpendicular to the longitudinal axis 700, and can be angled as discussed above in relation to the outer shoulders.

The segment 50 includes a downhole connection 60 and an uphole connection 68. The segment 50 is configured so that the uphole connection 68 is positioned at an uphole location relative to the downhole connection 60. The downhole connection 60 includes a male coupling portion having an exterior threaded section 64, and is referred to herein as a "pin end" of the BHA or wired pipe segment. The uphole connection 68 includes a female coupling portion having an interior threaded section 66, and is referred to herein as a "box end" of the wired pipe segment. It should be understood, that 68 instead of 60 can include the downhole connection, because if the thread connection is used as a tool internal connection, the orientation of the pin does not matter.

The pin end 24 and the box end 26 are configured so that the pin end 24 of one BHA or wired pipe segment 50 can be disposed within the box end 26 of another BHA or wired pipe segment 50 to effect a fixed connection therebetween to connect the segment 50 with another adjacent segment 50 or other downhole component. In one embodiment, the exterior threaded section 64 of the male coupling portion and the interior threaded section 66 of the female coupling portion are tapered.

As illustrated, the segment 50 includes a first portion 40 of a transmission device 34 disposed therein and located at the box end 26. The other (or second) portion 42 of the transmission device 34 is shown as being disposed in the pin end 24.

As will be understood by reference to the following figures, the combination of the first portion 40 and the second portion 42 form the transmission device and allow for one or both of power and data to be transmitted from the one segment to another when the segments are threaded together.

In one embodiment, a complete transmission device is formed when the first and second portions are brought together such that at least one electrically conductive arc in the first portion 40 contacts at least one contacting element in the second portion 42.

The first portion can include multiple rings or portions of multiple rings in one embodiment. In one embodiment, the first portion 40 can include a single ring. In a further embodiment, the first portion 40 can include a single segment (arc) of a ring. In yet another embodiment, the first portion 40 can include a ring that is segmented into two or more portions (two or more arcs). Alternatively, the first portion 40 can include a plurality of rings. In this arrangement, each ring of the plurality of rings can be either whole, or segmented into one or more portions. When each ring of the plurality of rings is whole, the rings are concentric, and share the same central axis, i.e. longitudinal axis 700. In a non-limiting embodiment, where the first portion includes a single segment of a ring or arc, the contact surface area of the segment can occupy a range from where it at least covers the contact surface area of the flexible contacting element in the second portion 42, to where it almost closes the segment to form a whole ring. In another non-limiting embodiment, where the first portion includes a ring that is segmented into two portions, the combined contact surface area of the multiple segmented portions is such that it can occupy a range from where it at least covers the contact surface area of a flexible contacting element in the second portion 42, to where it almost closes all the segments to form a whole ring. The segments can be equally angular sized or have different angular dimensions.

A whole ring and a segment of a ring each have an arc length. Arc length is the distance between two points along a section of a curve. An electrically conductive member having a curve, and a contacting element having a curve, can therefore also be considered to have an arc length.

Figure 12B:
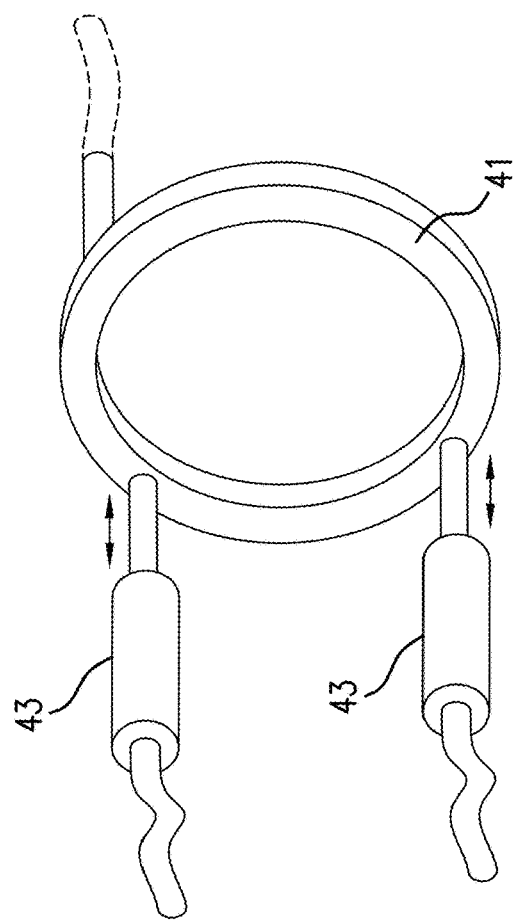
FIGS. 12A-12E show various combinations of contacting elements and arcs/rings according to one or more embodiments.
Figure 12A:
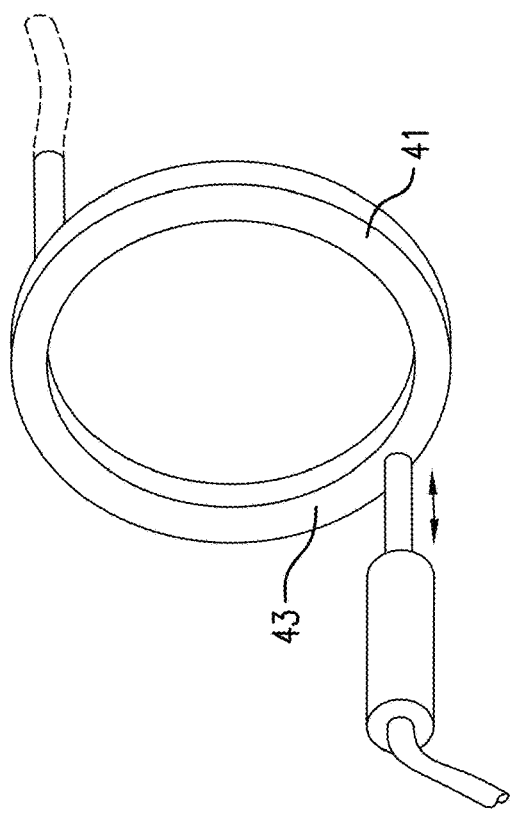
Figure 12D:
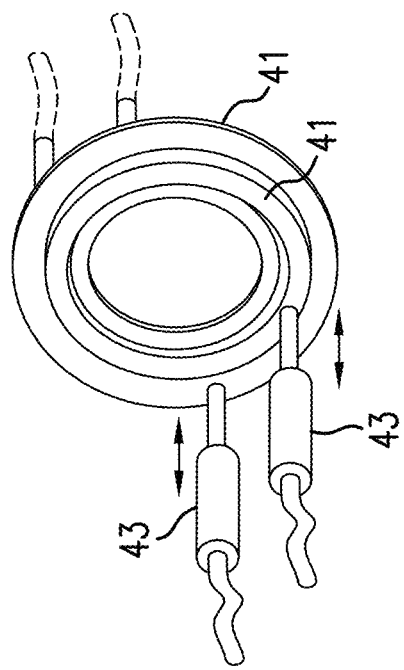
Figure 12E:
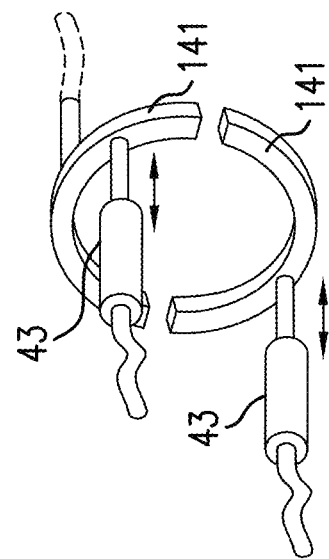
Figure 12C:
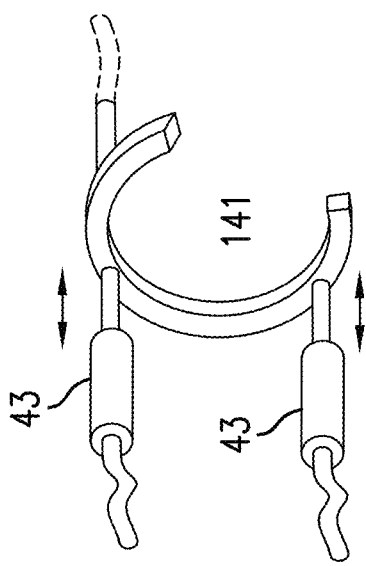

The second portion 42 can include one or more contacting elements. The one or more contacting elements may be rigid or flexible. It will be appreciated that various combinations are possible of the number and type (whole, segmented) of rings/arc in the first portion 40, and the number of flexible contacting elements in the second portion 42. Non-limiting examples include the following combinations: FIG. 12A—A single ring 41 in the first portion combined with a single flexible contacting element 43 in the second portion. FIG. 12B—A single ring 41 in the first portion combined with two flexible contacting elements 43 in the second portion. FIG. 12C—A single segmented ring 141 in the first portion combined with two flexible contacting elements 43 in the second portion. FIG. 12D—Multiple whole rings 41 in the first portion combined with multiple flexible contacting elements 43 in the second portion. FIG. 12E—In the first portion a ring that is segmented into two portions (two arcs) 141, combined with two flexible contacting elements 43 in the second portion, wherein each flexible contacting element 43 is combined with a different ring segment or arc 141. The second portion 42 includes a gap into which the flexible contacting element is disposed in one embodiment. As will be discussed further below, this gap can allow reduced damping as compared to having two rings (one in each portion 40/42) contact one another. It is to be understood that the contacting element does not necessarily need to be located in the gap. The only limitation with respect to location of the contacting element is the ability to contact the conductive arc or ring in the first portion 40 of the transmission element 34 when the downhole end 53 and the uphole end 52 are brought together. The gap in this invention has a radial extension and an axial extension with respect to the longitudinal axis 700 of the BHA or wired pipe segment 50 (FIGS. 2B/2C). The gap may also be referred to as radial gap. The radial gap may form a full circle or may form only a portion of a circle, such as an arc.

When the two segments 50 are brought together, the flexible contacting element in the second portion 42 contacts and makes a direct electrical connection with the first portion (e.g., arc or ring) 40.

It shall be understood that the transmission devices disclosed herein can also be included in a repeater element disposed between adjacent segments 50 (e.g, within the box end). In such a case, the data/power is transmitted from the transmission device in one segment, into the repeater. The signal may then be passed "as is," amplified, and/or modified in the repeater and provided to the adjacent segment 50.

Regardless of the configuration, it shall be understood that each portion 40/42 of the transmission device 34 can be connected to one or more transmission lines 30. The connection to the transmission line could be galvanic, inductive or capacitive. The term "direct" as used with respect to a connection herein shall include a galvanic connection.

With reference to FIG. 2A and FIG. 2B, the first portion 40 can be arranged in a box end shoulder 36 of the box end 26. In such a case, and with reference to FIG. 2C, the second portion 42 will be located in the downhole end or pin end 53. Of course, the location of the first and second portions 40, 42 could be reversed.

According to one aspect, a gap is created between the second portion and the conductive ring in the first portion in areas where the ring is not contacting the (flexible) contacting element or in areas outside the contacting area with the (flexible) contacting element. The inventors of the present invention have discovered that such a gap can improve the problems due to damping described generally above. It will be understood by the skilled person, that a gap could also be created between the conductive ring in the first portion and the ring insulating material in which the conductive ring is located, the ring insulating material being shaped in a same or similar manner to the first portion.

With further reference to FIGS. 2A-2C, in a non-limiting embodiment of the invention, the alignment of segments 50 may be accomplished by utilizing time cut threads. A time cut embodiment includes a pipe joint and/or a BHA sub having all threads of a pin and/or box end cut to precise specifications. When the threads of one segment 50 are connected to a like-threaded segment 50, the respective pin and box ends 24 26 are reproducibly oriented. The pin end 24 includes pin end threads 62 that are compatible with box end threads 38 of the box end 26. Time cut threads are precision cut such that a predetermined number of turns results in the precise positioning of the segments 50 each time the pipes are mated, so guaranteeing the angular position of the segments 50. Alternatively, the alignment of segments 50 is accomplished by conventional methods other than by utilizing time cut threads, for example, by using axial arranged shims to adjust the distance of shoulders 35 and 36.

Figure 3A:
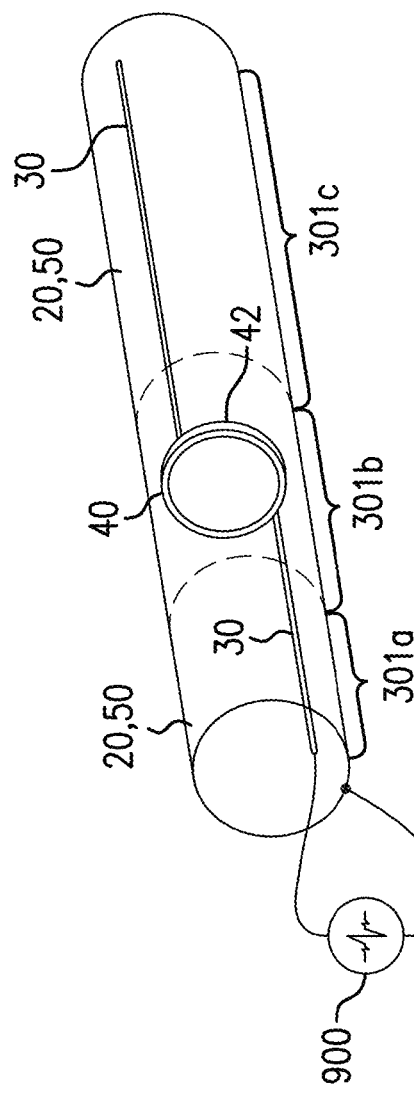
FIGS. 3a-3c show, respectively, a portion of a drill string, a circuit model of the drill string, and a simplified circuit diagram of the circuit of 3b.
Figure 3B:
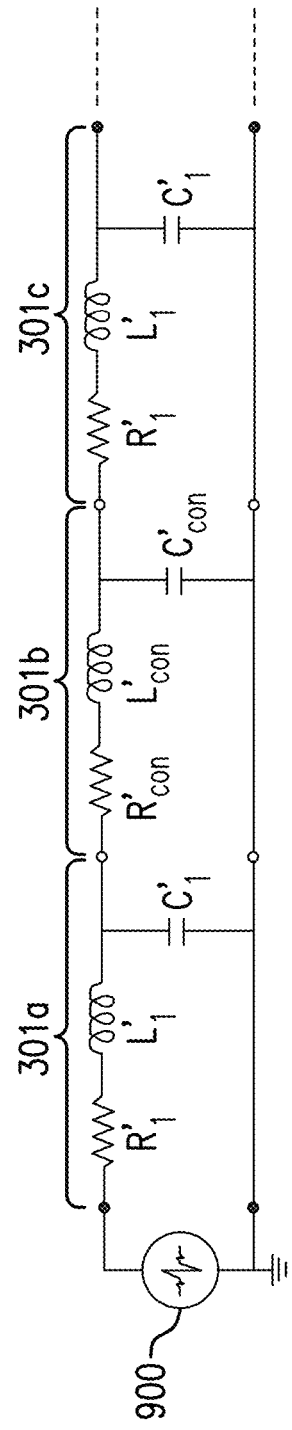
Figure 3C:
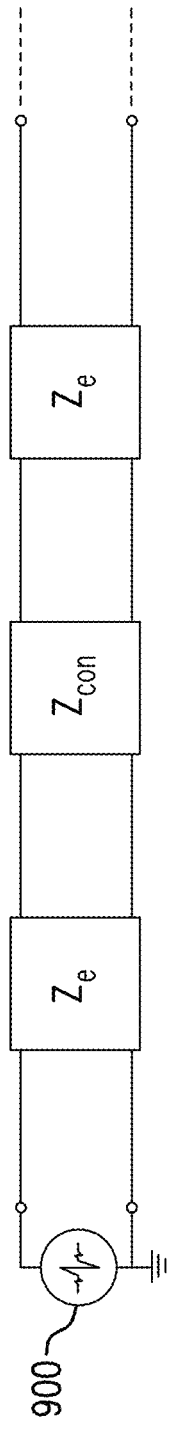

With reference now to FIGS. 3A-3C, simultaneous transmission of both, data with a high frequency signal and power 900, can lead to the challenges in data signal degradation due to damping loss at every transmission pair (e.g., at every first and second portions 40, 42 junction). Furthermore the cross section of the transmission line cannot be reduced because of the power transmission capability. The damping loss of a high frequency data signal in a transmission device is mainly specified by difference of the characteristic impedance Z of the transmission device and the transmission line. In particular, in FIG. 3A three different sections are shown, a first transmission line section 301a, a connection section 301b, and a second transmission line section 301c. The first and second transmission line sections 301a, 301c can be in different rigid elements 20, 50. Around the junction of the first and second portions 40/42 is a connection section 301b that includes first and second portions 40/42 and some length of transmission line 30. The first and second transmission line sections 301a, 301c also include a length of transmission line 30. In a non-limiting embodiment, the transmission line 30 can be a PL48 bus (Power Line Bus), on which encoded data can be transmitted as a high frequency signal. Transmission of high frequency signal carrying data information is used in bottom hole assemblies to transmit measurement data (formation evaluation or operational data), instruction data, calibration data and diagnostic data within the bottom hole assembly from one electronics device to another electronics device. These electronics devices may be located within one downhole tool or may be located in different downhole tools. In latter case the high frequency signal carrying data information need to be transmitted through a tubular connection.

Based on the physics of electromagnetic waves, an optimal high frequency data transmission system in a drill string consists of elements, which all have the same characteristic impedance Z as the transmission line.

Previous transmission devices for threaded drill string connections are often built in a way that two contact rings around the thread connection are connected together to establish an electrical contact. These designs implement, from a simplified point of view, a kind of cylindrical capacitor which has a different, often lower, characteristic impedance Z than a transmission line with the characteristic impedance $Z_1$. The characteristic impedance can be calculated as follows:

$$Z = \sqrt{\frac{R' + jwL'}{G' + jwC'}}$$

where R' is the resistance load per unit length, G' is the conductance of the dielectric per unit length, L' is the inductance per unit length and C' is the capacitance per unit length. For example, the system disclosed herein and shown in FIG. 3A can be modeled by the circuit shown in FIG. 3B.

In FIG. 3B the electrical characteristics of first and second transmission line sections 301a, 301c are modeled as being the same and have the same R, L, C values of $R'_1$, $L'_1$ and $C'_1$. In the connection section 301b the R, L, C values are referred to $R'_{con}$, $L'_{con}$ and $C'_{con}$.

For high frequency signals (e.g. >1 Mhz) the characteristic impedance can be calculated by:

$$Z_{hf} = \sqrt{\frac{L'}{C'}}$$

In this case, the impedance of the transmission line $Z_{1,hf}$ has normally a value between 10Ω and some 100Ω. The capacity per unit length C' of a capacitor can be calculated as follows:

$$C' = \varepsilon_o \cdot \varepsilon_R \cdot f(\text{geometry}) = \frac{dC}{dx}$$

where $\varepsilon_o$=Vacuum permittivity, $\varepsilon_R$=Relative permittivity, and f(geometry) geometry depending function, for an ideal cylinder $2\pi/\ln(R_2/R_1)$.

In FIG. 3B, every transmission line section (301a, 301c) and connection line section (301b) is modeled by an equivalent network element for a two-wire circuit, consisting of a capacitance C', a resistance R' and a inductance L' (for high frequencies). The transmission line is optimal, if every characteristic impedance Z of the model has the same value as shown in FIG. 3C. Characteristic impedance Ze of transmission line sections 301a and 301c equal characteristic impedance Zcon of connection section 301b. (Ze (301a)= Zcon (301b)=Ze (301c)). The influence of damping of one equivalent network element can be calculated by the Q-factor, that describes how underdamped an oscillator is and characterizes a resonator's bandwidth relative to its center frequency. For a series connection, like the transmission line model, the Q-Factor of the connection between the two is calculated by:

$$Q = \frac{1}{R}\sqrt{\frac{L'}{C'}}$$

A high Q-factor represents a network element with low damping properties. Thus, an electrical downhole communication connection should have a low capacitance C'. As will be further understood from the following discussion, embodiments of the present invention provide for a connection between a conductive ring and a flexible contacting element that has a low C' by providing an air gap between the conductive ring or arc and regions where the flexible contacting element does not contact the conductive ring, or in regions outside the contacting region with the (flexible) contacting element. This is true because the above equation for C' includes $\varepsilon_R$. If an air gap near the conductor is provided a a low permittivity $\varepsilon_R$=1.00059 may be achieved. PEEK for example has an $\varepsilon_R$=3 . . . 5. $\varepsilon_R$ of a material also depends on frequency. Variation of the geometry is limited because of the design space. Thus an air gap is the most efficient way to decrease C'.

FIG. 4 shows an example of a transmission device 34 that includes a first portion 40 that will mate with a second portion 42 to form a transmission element 34 that defines a communication path between two transmission lines 30a, 30b. The first portion 40 includes an electrically conductive ring 41 carried in ring insulating material 180 that is shaped in a same or similar manner to the first portion 40. In some places herein, the first section can also referred to as a ring conductor or simply as a "ring." The ring 40 is electrically connected to the transmission line 30a. Non limiting embodiments of the first portion include a portion of a ring or an arc.

The second portion 42 as illustrated includes a contacting element 43 that is electrically connected to transmission line 30b. The contacting ring may be flexible. When the first portion 40 and second portion 42 are brought together, the electrically conductive ring 41 makes contact with the flexible contacting element 43 to form an electrical connection and, as such, to electrically connect the two transmission lines 30a, 30b The second portion 42 includes an outer insulating carrier 45. As will be shown in greater detail below, the outer insulating carrier 45 is sized and arranged such that it defines a groove, also referred to as outer insulating carrier groove. This groove, when the electrically conductive ring 41 and the flexible contacting element 43 are brought together, will allow for the creation of a gap 51 between the ring 41 and the second portion 42 such that electrical contact between the electrically conductive ring 41 and the second portion 42 is only where the electrically conductive ring 41 contacts the flexible contacting element 43. In an embodiment, the outer insulating carrier 45 defines a gap 51 that is opposite the electrically conductive ring 41, and which creates spacing between the ring 41 and the second portion 42 such that electrical contact between the electrically conductive ring 41 and the second portion 42 is only where the electrically conductive ring 41 contacts the flexible contacting element 43.

The gap 51 defined by the outer insulating carrier 45 can help reduce the electrical impedance (and thus the damping) of the connection in regions where there is no electrical contact with the electrically conductive ring 41 as compared to having an electrically conductive ring in the second portion 42. It shall be understood that the gap 51 defined by the outer insulating carrier 45 may be referred to as a region herein. The region can be filled with air or filled with a first material that contains a second material as described below. The second material can be a solid, liquid or gas which has a relative permittivity lower than that of the material of the outer insulating carrier 45. In an ideal case a permittivity close to 1. Alternatively, the region can be filled with only a first material that has a low permittivity, such as a permittivity smaller than 5, or smaller than 4, or smaller than 3, or smaller than 2.

In one embodiment, the second portion 42 can include edges or shoulders 47, 49 that contact the ring insulating material 180 when portions 40/42 are brought together. These edges 47, 49 can be formed by the outer insulating carrier 45 as shown in FIG. 4 or by another insulating element disposed in a groove (outer insulating carrier groove) in the outer insulating carrier 45 as discussed further below. The edges, regardless of how formed, can serve as sealing surfaces that keep moisture that may be in the gap 51 from contacting the rigid element (e.g., collar 20 or wired drill pipe 50) and causing a short circuit that could destroy or limit the electrical power/communication connection.

In one embodiment, flexible contacting element 43 can be formed as a coiled spring or another flexible metal configuration.

In one embodiment, the flexible contacting element 43 can be connected to an assembly 102. This assembly 102 can be as simple as a direct electrical connector formed in any manner (e.g., wire, conductive collar, etc.) or can allow for movement of the flexible contacting element 43.

For example, and with reference now to FIG. 5, an example of the elements inside the assembly 102 are illustrated. The assembly includes an outer housing generally shown reference numeral 104. The outer housing can be formed of insulating material and be sized and shaped to be received in passages 32/54 described above. Further, for the sake of simplicity, only the housing 20 will be described further herein. However, the same teachings are applicable to the segment 50.

The assembly 102 also includes the flexible contacting element 43. In FIG. 5 the flexible contacting element 43 is shown as a pin and can be formed of metal or another electrically conductive material. The assembly 102 can be connected to transmission line 30 and serves to electrically connect the flexible contacting element 43 to the inner conductor 23 of the transmission line 30. In the illustrated embodiment, a length compensation sleeve 106 is provided to allow for such connection. The length compensation sleeve 106 serves to electrically connect the flexible contacting element 43 to the inner conductor 23 of the transmission line 30, and to isolate the electrical signal passing therethrough so the electrical signal is not lost to the outside of the assembly 102.

The length compensation sleeve 106 can be formed of metal or another electrically conductive material. The compensation sleeve 106 can include a central passage 110 that receives the flexible contacting element 43 and allows it to move in the direction shown by arrow B within the sleeve 106.

Also provided in the pin assembly 102 is a biasing member 108 that is illustrated as a spring but other biasing members could be used that are capable of affecting axial movement of the flexible contacting element 43, for example, a flexible member or a flexible material, an elastomeric material, or a biasing member using a gas-filled or oilfilled chamber. The biasing member 108 causes the flexible contacting element 43 to extend in the direction C until it is pushed in direction D when it contacts the ring. This biasing in direction C provides for a robust and adjustable connection to the ring during drilling or other operations. As will be understood, biasing the flexible contacting element 43 in direction C can cause the pin to extend beyond a shoulder surface in the end (pin end or box end) of the housing 20a/20b.

While a direct connection between the inner conductor 23 and the flexible contacting element 43 is shown in FIG. 5, it shall be understood that signals can be transmitted by other means such as capacitive, inductive or resonant coupling.

Optionally, to provide surface for the biasing member to interact with, the flexible contacting element 43 can include a contact ring 112.

As illustrated in FIG. 5, the flexible contacting element 43 has a pointed tip 160. As illustrated in FIGS. 6A and 6B, the tip 160 of flexible contacting element 43 could be pointed (FIG. 6A) or formed as a spring shaped to form a widened flexible surface 162. The widened flexible surface can be used in either a spring loaded assembly or one that does not allow for it to move. As illustrated in FIGS. 6C-E, the tip 160 of flexible contacting element 43 could be profiled. In an embodiment, the flexible contacting element 43 can be a pin.

In one embodiment, the pin or box end of a housing 20 includes a groove into which the first portion 40 can be placed. In one embodiment, a second portion 42 will be located in a similar groove formed in the other end of the housing 20. These grooves are shown in more detail in FIG. 7.

FIG. 7 shows a cross section of two housings 20 joined together. For clarity, the housings are labelled 20a and 20b and it will be understood that housing 20b will include the first portion 40 with electrically conductive ring 41. Housing 20a will include a second portion 42.

Housing 20b includes a groove 182 (e.g. box end groove). Housing 20a includes a groove 184 (e.g. pin end groove). The groove 182 can be formed in either the mating shoulder of the pin or box end of a housing 20b. As illustrated, the other of the shoulder of the pin or box end of housing 20a meets and mates with housing 20b to form a mating junction 198.

The groove 182 includes the ring insulating material 180 that forms part of the first portion 40 disposed therein. The ring insulating material 180 can be any type of insulating material and can serve to insulate the electrically conductive ring 41 from the housing 20b.

In the embodiment of FIG. 7, the housing 20b includes a groove 182. In such an embodiment, the ring insulating material 180 can be sized and shaped such that when the first portion is disposed therein, a gap 51 exists between the ring 41 and the second portion 42 (in a region without the flexible contacting element 43). In particular, the second portion 42 is separated from the electrically conductive ring 41 by the gap 51 in regions where the flexible contacting element 43 does not contact the electrically conductive ring 41, or in regions outside the contacting region between the contacting ring or arc with the (flexible) contacting element.

The gap can be filled with air in one embodiment and the size of it can be selected in such a manner that the capacitance and Q of the electrical connection between the first and second portions 40, 42 can be adjusted such that the impedance at or near the connection section matches the impedance of adjacent transmission line sections. With reference again to FIGS. 3B and 3C, this means that $C'_{con}$ can be selected such that $Z_{con}$ equals or is near Ze.

Further, as shown in FIG. 7, the sealing edges 47, 49 contact the ring insulating material 180 when portions 40/42 are brought together. The edges, regardless of how formed, can serve as sealing surfaces that keep moisture that may be in the gap 51 from contacting the housing 20a/20b and short circuiting one or both of the first and second portions 40, 42.

As discussed above, the sealing edges 47, 49 can be formed by the outer insulating carrier 45 as shown in FIG. 4 and FIG. 8 or by another insulating element disposed in a groove in the outer insulating carrier 45 (outer insulating carrier groove). For example, and with reference to FIG. 8, an insert 800 that includes sealing edges 47, 49 can be disposed within the outer insulating carrier groove 46 in the insulating carrier 45 and in such case, the insert 800 will define the gap 51. The insert 800 can be formed of any non-conductive material.

Figure 13:
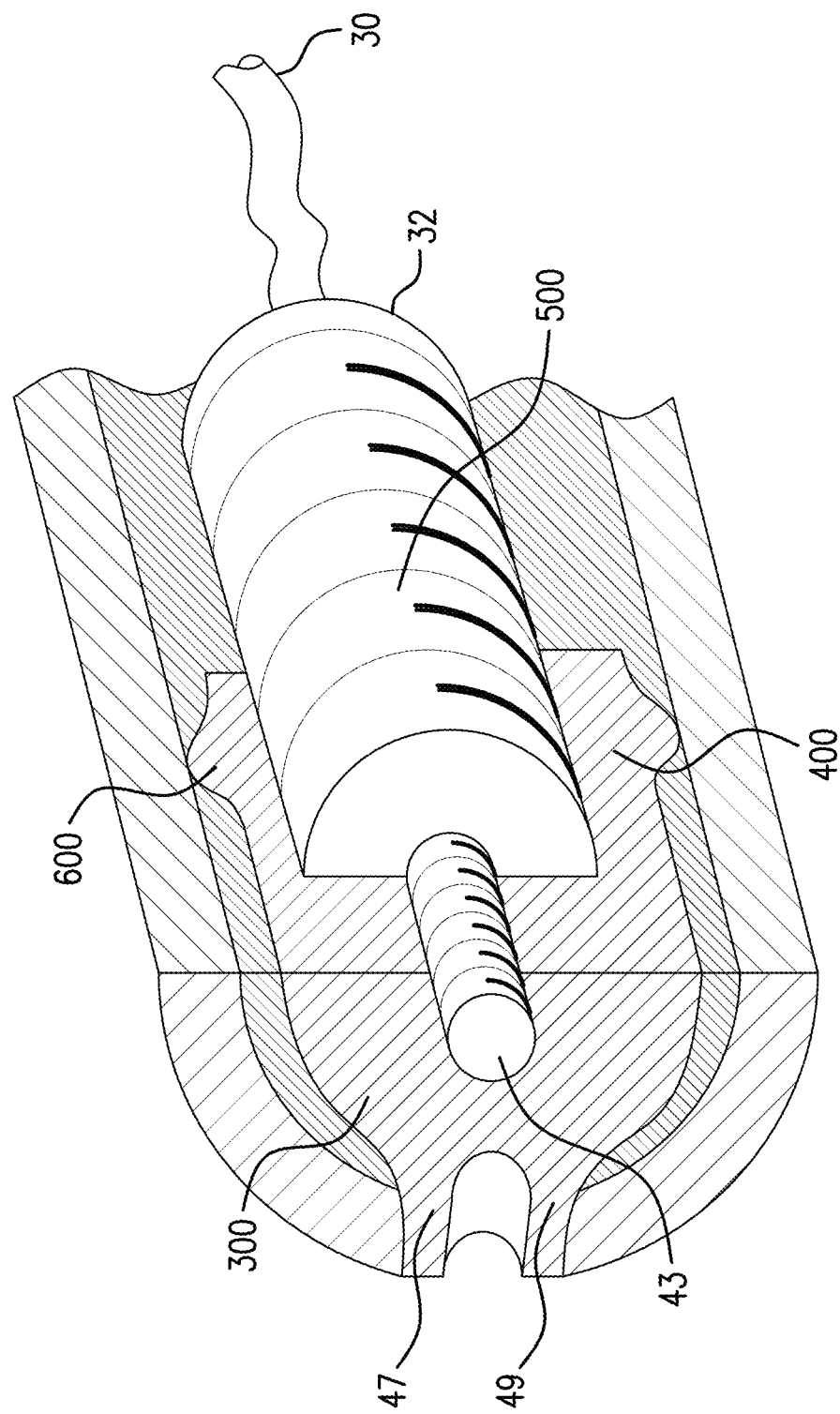
FIG. 13 shows an embodiment of the second portion of the transmission device.

With reference to FIG. 13, an embodiment of the second portion 42 of the transmission device is illustrated, that shows a dual sealing aspect of the invention. Sealing edges 47, 49 of the second portion form a seal with the first portion (not shown), when the flexible contacting element 43 of the second portion contacts the electrically conductive ring (not shown) of the first portion. A spacer 300 is disposed therein, that includes the sealing edges 47, 49. A radial body 400 extends axially from the spacer 300 along the gun-drilled passageway 32 in which the transmission line 30 is located. Housing 500 of the flexible contacting element 43 is mounted in the inner diameter of the radial body 400, and on the outer diameter of the radial body 400 a sealing element 600 is disposed, that seals the gun-drilled passageway 32 in both a radial and axial direction. Wherein radial and axial is referring to the longitudinal axis of the passageway 32.

Figure 9:
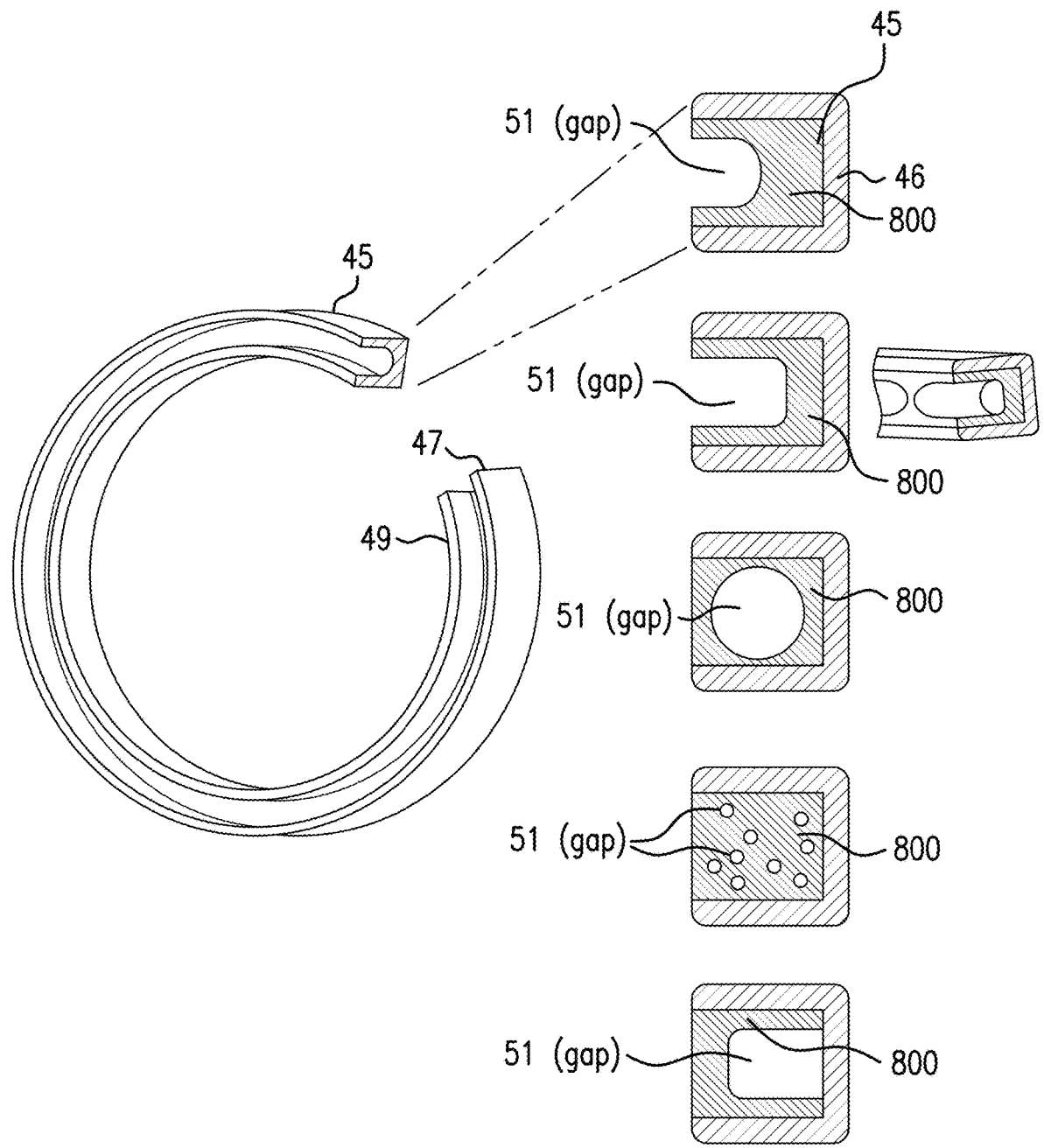
FIG. 9 shows alternative examples of a gap or cavity that either define a gap or a gap that can be filled with one or more materials.

In the above description a "gap" has been defined as being between two elements. However, the skilled artisan will realize that the "gap" can be replaced in any prior embodiment with a groove. Referring now to FIG. 9, an outer insulating carrier 45 is shown. The groove in the outer insulating carrier includes a region. The "region" can be filled with air (as in the gap above) or it can be filled with a first material that optionally contains a second material, the second material having a relative permittivity lower than that of the outer insulating carrier. The region can also comprise a first material that comprises a plurality of gaps or cavities. In one embodiment the first material can be grease, such as grease used to make up a downhole connection (pin-box connection).

In one embodiment, the material that can fill the groove includes a "multi-material" which contains at least one material (solid, liquid or gas), which has a relative permittivity lower than that of the outer insulating carrier. In another embodiment, the material that can fill the groove includes a "material matrix" which contains small gaps or bubbles to decrease the relative permittivity to a value lower than that of the outer insulating carrier. The different regions of different embodiments of inserts 800 (gaps 51/bubbles; sealing edges 47, 49) are shown with respect for FIG. 9. The gaps/bubbles can define individual regions resulting in the creation of many regions in the outer insulating carrier 45.

In another non-limiting embodiment, the material that can fill the groove is a material whose relative permittivity has an $\varepsilon_R$ value that is less than 30. In other embodiments, the $\varepsilon_R$ value of the material that can fill the groove can be, for example, less than 25, less than 20, less than 15, less than 10, less than 5, or less than 2. When the material has an $\varepsilon_R$ value of less than 2, air is the preferred material.

In yet another non-limiting embodiment, the material that can fill the groove is a material with a lower conductivity or a lower permittivity relative to the contacts, electrodes or the metal of the tubulars. The second material, if present, can also be a material with a lower conductivity or a lower permittivity relative to the contacts, electrodes or the metal of the tubulars. Examples of the first and second material in this regard include air and plastic material.

It shall be understood that the biasing element, for example, a spring, a flexible material (such as an elastomer, or rubber), a hydraulic spring, or a pneumatic spring, does not necessarily have to be an element that is separate from the flexible contacting member. For example, the flexible contacting element and biasing element can be a single element in one embodiment. In such a case, a length compensation sleeve is not required, as the single pin-spring body functions as the conductive element.

Figure 10:
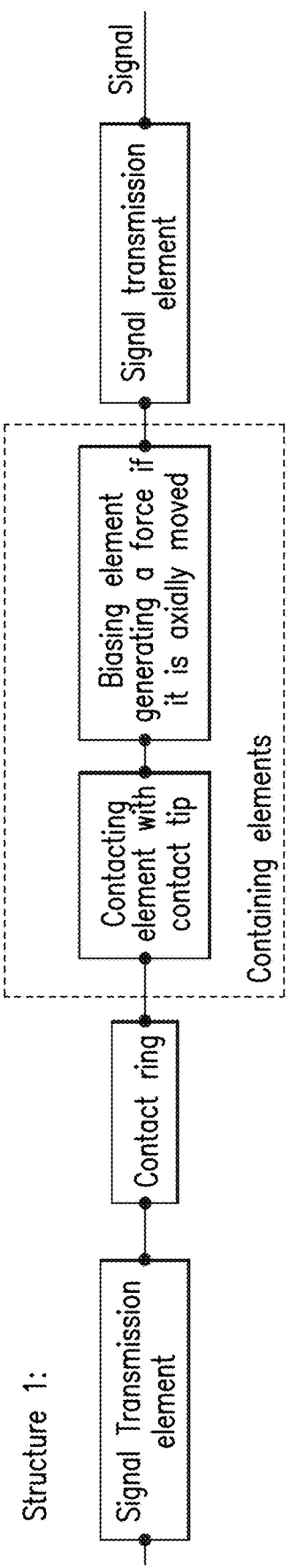
FIG. 10 shows a block diagram of a transmission device according to one embodiment.
Figure 11:
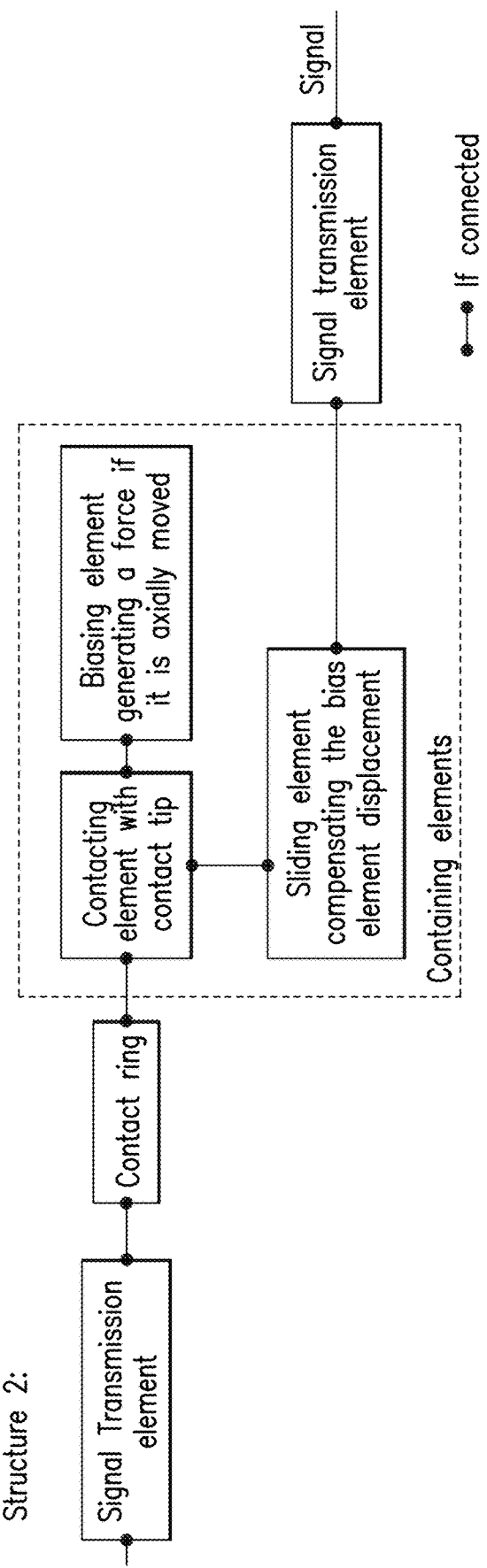
FIG. 11 shows a block diagram of a transmission device according to another embodiment.

Two different versions of schematics of connectors are shown in FIGS. 10 and 11. In FIG. 10, the flexible contacting element and biasing element are one. In FIG. 11, the flexible contacting element is connected to the biasing element, and the length compensation sleeve is employed as described above. In FIG. 10 it shall be understood that while a "ring" is referenced, only an arc need be provided.

Figure 14:
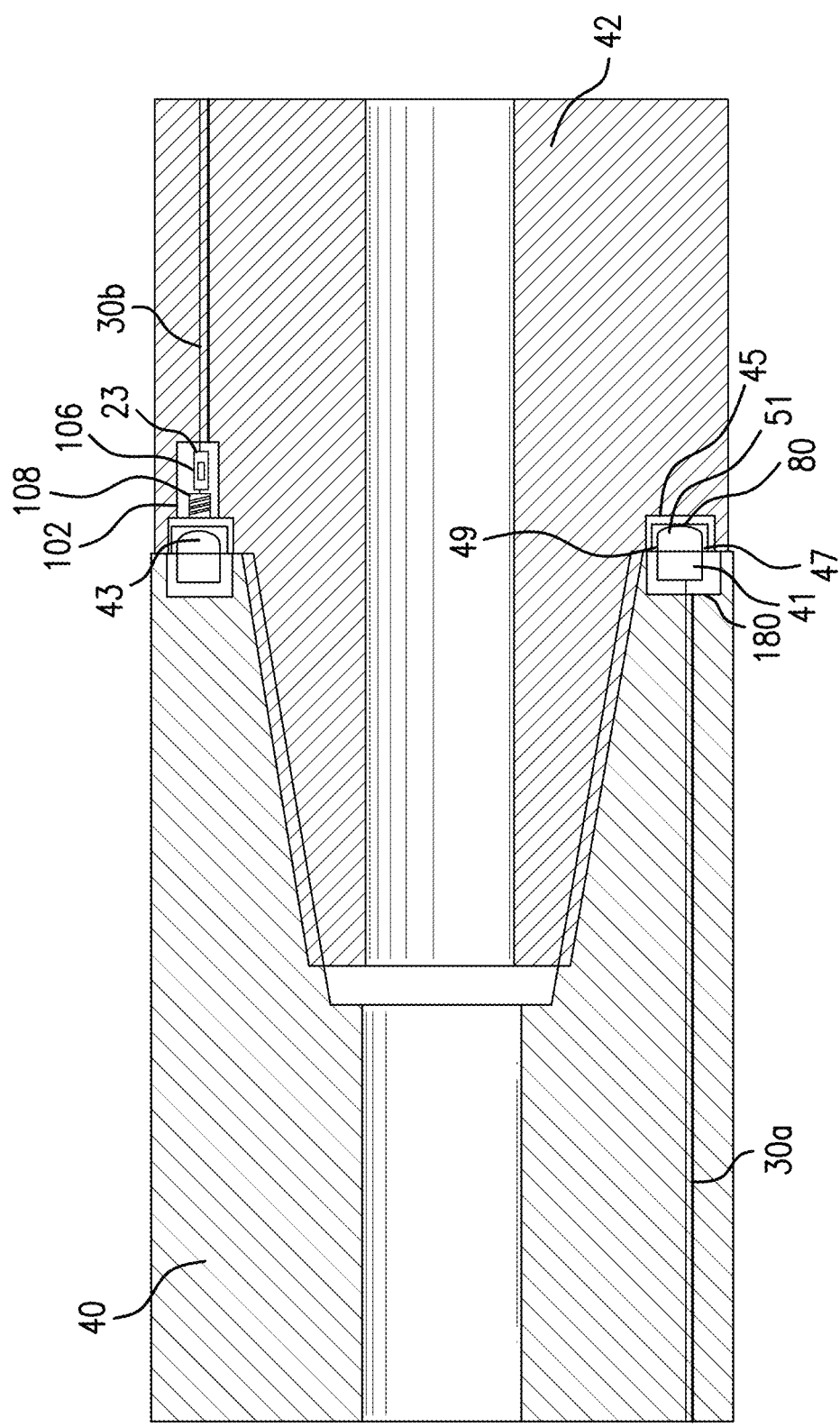
FIG. 14 is a cross-sectional side view of an embodiment of a pin assembly.
Figure 15:
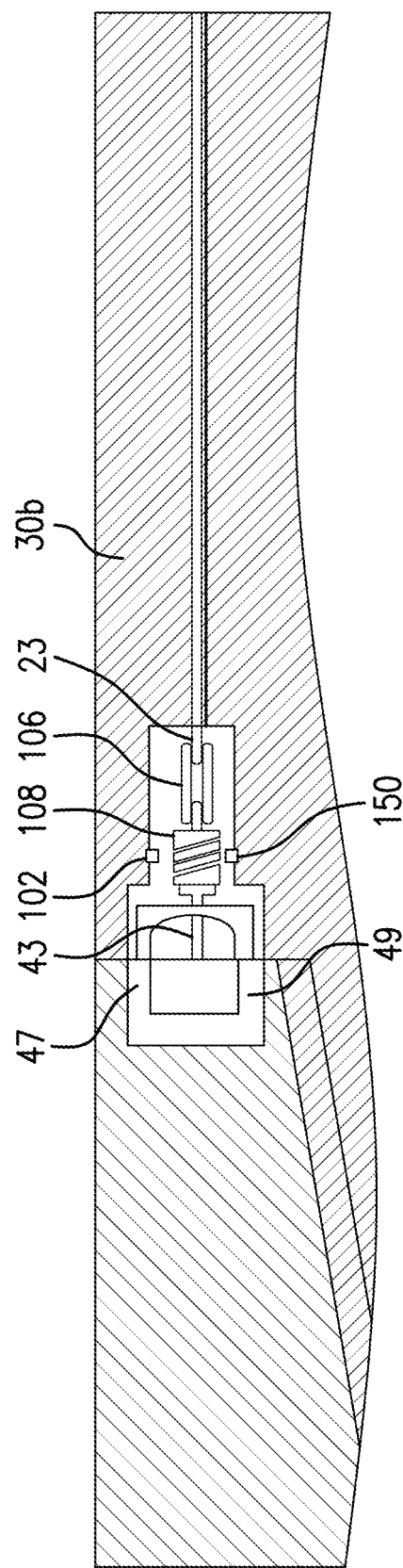
FIG. 15 is a cross-sectional side view of an embodiment of a pin assembly.

FIG. 14 and FIG. 15 further illustrate features of the pin assembly 102. The arrangement of the flexible contacting element 43 with the electrically conductive ring 41 carried in ring insulating material 180 is shown, together with the gap 51, outer insulating carrier 45, sealing edges 47, 49, and insert 800. Other features indicated include the biasing member 108 (here a coiled spring), the length compensation sleeve 106, the inner conductor 23 of the transmission line 30 (here 30*a*, 30*b*), and the first and second portions 40, 42. An optional seal 150 is also indicated.

Versions and variations of the present disclosure are shown in the below non-limiting embodiments:

Embodiment 1: A downhole assembly comprising: a first tubular including a first shoulder; a second tubular including a second shoulder; and a transmission element that includes: a first portion disposed in the first shoulder, the first portion includes an electrically conductive member having a first arc length; and a second portion disposed in the second shoulder, the second portion includes a contacting element having a second arc length that is substantially less than the first arc length, the second portion further including an outer insulating carrier that defines a groove and the contacting element is disposed in the outer insulating carrier; wherein, when the first tubular is joined to the second tubular, the contacting element contacts the electrically conductive member and the second portion defines at least one region between the electrically conductive member and the second portion in areas of the groove where the contacting element does not contact the electrically conductive member.

Embodiment 2: The downhole assembly as in any prior embodiment, wherein the second arc length is greater than 180°.

Embodiment 3: The downhole assembly as in any prior embodiment, wherein the at least one region comprises a gap.

Embodiment 4: The downhole assembly as in any prior embodiment, wherein the radial gap comprises air.

Embodiment 5: The downhole assembly as in any prior embodiment, wherein the at least one region comprises a first material.

Embodiment 6: The downhole assembly as in any prior embodiment, wherein the first material comprises at least one second material having a relative permittivity lower than that of the outer insulating carrier.

Embodiment 7: The downhole assembly as in any prior embodiment, wherein the second material is air.

Embodiment 8: The downhole assembly as in any prior embodiment, wherein the first material comprises a plurality of gaps.

Embodiment 9: The downhole assembly as in any prior embodiment, wherein the contacting element is a flexible contacting element.

Embodiment 10: The downhole assembly as in any prior embodiment, wherein the flexible contacting element is operably connected to a biasing member.

Embodiment 11: The downhole assembly as in any prior embodiment, wherein the flexible contacting element comprises a length compensation sleeve.

Embodiment 12: The downhole assembly as in any prior embodiment, wherein the flexible contacting element comprises a biasing member.

Embodiment 13: The downhole assembly as in any prior embodiment, wherein the first portion includes insulating material surrounding a portion of the electrically conductive member.

Embodiment 14: The downhole assembly as in any prior embodiment, further including sealing edges that seal moisture in the gap such that the moisture does not create a short circuit between the electrically conductive member and the first and second tubulars.

Embodiment 15: The downhole assembly as in any prior embodiment, wherein the sealing edges contact the insulating material when the first tubular is joined to the second tubular.

Embodiment 16: The downhole assembly as in any prior embodiment, wherein the second tubular comprises a passageway, the passageway allowing passage of a transmission line, wherein the transmission line is electrically connected to the contacting element in the second portion; further comprising a sealing element in the passageway, wherein the sealing element is sealing the passage way Embodiment 17: The downhole assembly as in any prior embodiment, wherein the first tubular and the second tubular are downhole tools in a bottom hole assembly.

Embodiment 18: The downhole assembly as in any prior embodiment, wherein the contacting element is a pin.

Embodiment 19: The downhole assembly as in any prior embodiment, the pin further comprising a tip and wherein the tip comprises a widened flexible surface.

Embodiment 20: The downhole assembly as in any prior embodiment, wherein a first transmission line is electrically connected to the electrically conductive member and a second transmission line is connected to the contacting element.

Embodiment 21: A method of simultaneously transmitting power and data with a high frequency signal using a downhole assembly comprising: providing a first tubular including a first shoulder; providing a second tubular including a second shoulder; disposing a first portion of a transmission element in the first shoulder, the first portion including an electrically conductive member having a first arc length; disposing a second portion of the transmission element in the second shoulder, the second portion including a contacting element having a second arc length, wherein the second arc length is substantially less than the first arc length, and wherein the second portion further includes an outer insulating carrier that defines a groove and the contacting element is disposed in the outer insulating carrier; joining the first tubular to the second tubular such that the contacting element contacts the electrically conductive member and the second portion defines at least one region between the electrically conductive member and the second portion in areas of the groove where the contacting element does not contact the electrically conductive member; providing a signal that includes one or both of data and power to the first portion and transferring the signal to the second portion.

While embodiments described herein have been described with reference to specific figures, it will be understood that various changes may be made and equivalents may be substituted for elements thereof without departing from the scope of the present disclosure. In addition, many modifications will be appreciated to adapt a particular instrument, situation, or material to the teachings of the present disclosure without departing from the scope thereof. Therefore, it is intended that the disclosure not be limited to the particular embodiments disclosed, but that the present disclosure will include all embodiments falling within the scope of the appended claims or the following description of possible embodiments.

In support of the teachings herein, various analysis components may be used including a digital and/or an analog system. For example, controllers, computer processing systems, and/or geo-steering systems as provided herein and/or used with embodiments described herein may include digital and/or analog systems. The systems may have components such as processors, storage media, memory, inputs, outputs, communications links (e.g., wired, wireless, optical, or other), user interfaces, software programs, signal processors (e.g., digital or analog) and other such components (e.g., such as resistors, capacitors, inductors, and others) to provide for operation and analyses of the apparatus and methods disclosed herein in any of several manners well-appreciated in the art. It is considered that these teachings may be, but need not be, implemented in conjunction with a set of computer executable instructions stored on a non-transitory computer readable medium, including memory (e.g., ROMs, RAMs), optical (e.g., CD-ROMs), or magnetic (e.g., disks, hard drives), or any other type that when executed causes a computer to implement the methods and/or processes described herein. These instructions may provide for equipment operation, control, data collection, analysis and other functions deemed relevant by a system designer, owner, user, or other such personnel, in addition to the functions described in this disclosure. Processed data, such as a result of an implemented method, may be transmitted as a signal via a processor output interface to a signal receiving device. The signal receiving device may be a display monitor or printer for presenting the result to a user. Alternatively or in addition, the signal receiving device may be memory or a storage medium. It will be appreciated that storing the result in memory or the storage medium may transform the memory or storage medium into a new state (i.e., containing the result) from a prior state (i.e., not containing the result). Further, in some embodiments, an alert signal may be transmitted from the processor to a user interface if the result exceeds a threshold value.

Furthermore, various other components may be included and called upon for providing for aspects of the teachings herein. For example, a sensor, transmitter, receiver, transceiver, antenna, controller, optical unit, electrical unit, and/or electromechanical unit may be included in support of the various aspects discussed herein or in support of other functions beyond this disclosure.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" or "substantially" used in connection with a quantity is inclusive of the stated value and has the meaning dictated by the context (e.g., it includes the degree of error associated with measurement of the particular quantity). For example, the phrase "substantially constant" is inclusive of minor deviations with respect to a fixed value or direction, as will be readily appreciated by those of skill in the art.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the present disclosure.

The teachings of the present disclosure may be used in a variety of well operations. These operations may involve using one or more treatment agents to treat a formation, the fluids resident in a formation, a wellbore, and/or equipment in the wellbore, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

Accordingly, the following claims are not to be seen as limited by the foregoing description.

What is claimed is:

1. A downhole assembly comprising:
   a first tubular including a first shoulder;
   a second tubular including a second shoulder; and
   a transmission element that includes:
   a first portion disposed in the first shoulder, the first portion including an electrically conductive member having a first arc length; and
   a second portion disposed in the second shoulder, the second portion including a contacting element having a second arc length that is less than the first arc length, the second portion further including an outer insulating carrier that defines a groove, and the contacting element disposed in the outer insulating carrier;
   wherein, when the first tubular is joined to the second tubular, the contacting element contacts the electrically conductive member and the second portion defines at least one region between the electrically conductive member and the second portion in areas of the groove where the contacting element does not contact the electrically conductive member;
   wherein the at least one region comprises a first material and a second material;
   wherein the first material is formed of a non-conductive material and the second material has a relative permittivity lower than that of the outer insulating carrier.

2. The downhole assembly of claim 1, wherein the first arc length is greater than 180°.

3. The downhole assembly of claim 1, wherein the at least one region comprises a gap.

4. The downhole assembly of claim 3, wherein the gap comprises air.

5. The downhole assembly of claim 1, wherein the second material is air.

6. The downhole assembly of claim 1, wherein the first material comprises a plurality of gaps.

7. The downhole assembly of claim 1, wherein the contacting element is a flexible contacting element.

8. The downhole assembly of claim 7, wherein the flexible contacting element is operably connected to a biasing member.

9. The downhole assembly of claim 8, wherein the flexible contacting element comprises a length compensation sleeve.

10. The downhole assembly of claim 7, wherein the flexible contacting element comprises a biasing member.

11. The downhole assembly of claim 1, wherein the at least one region comprises a gap and wherein the first portion includes insulating material surrounding a portion of the electrically conductive member.

12. The downhole assembly of claim 11, further including sealing edges in the second portion that seal moisture in the gap such that the moisture does not create a short circuit between the electrically conductive member and the first and second tubulars.

13. The downhole assembly of claim 12, wherein the sealing edges contact the insulating material when the first tubular is joined to the second tubular.

14. The downhole assembly of claim 12, wherein the sealing edges are in the first material.

15. The downhole assembly of claim 11, wherein the second tubular comprises a passageway, the passageway allowing passage of a transmission line, wherein the transmission line is electrically connected to the contacting element in the second portion; further comprising a sealing element in the passageway, wherein the sealing element is sealing the passage way.

16. The downhole assembly of claim 15, the pin further comprising a tip and wherein the tip comprises a widened flexible surface.

17. The downhole assembly of claim 1, wherein the contacting element is a pin.

18. The downhole assembly of claim 1, wherein a first transmission line is electrically connected to the electrically conductive member and a second transmission line is connected to the contacting element.

19. The downhole assembly of claim 1, wherein the first material comprises a gap.

20. The downhole assembly of claim 1, wherein the first material includes a plastic material.

21. A method of simultaneously transmitting power and data with a high frequency signal using a downhole assembly comprising:

providing a first tubular including a first shoulder;

providing a second tubular including a second shoulder;

disposing a first portion of a transmission element in the first shoulder, the first portion including an electrically conductive member having a first arc length;

disposing a second portion of the transmission element in the second shoulder, the second portion including a contacting element having a second arc length, wherein the second arc length is less than the first arc length, and wherein the second portion further includes an outer insulating carrier that defines a groove and the contacting element is disposed in the outer insulating carrier;

joining the first tubular to the second tubular such that the contacting element contacts the electrically conductive member and the second portion defines at least one region between the electrically conductive member and the second portion in areas of the groove where the contacting element does not contact the electrically conductive member, wherein: the at least one region comprises a first material and a second material; the first material is formed of a non-conductive material; and the second material has a relative permittivity lower than that of the outer insulating carrier; and providing the signal to the first portion and transferring the signal to the second portion.

\* \* \* \* \*